United States Patent [19]
Bierenfeld

[11] 3,819,099
[45] June 25, 1974

[54] STRAND THREADING DEVICE
[75] Inventor: Herbert Henry Bierenfeld, Doraville, Ga.
[73] Assignee: Western Electric Company, Incorporated, New York, N.Y.
[22] Filed: May 8, 1972
[21] Appl. No.: 251,336

[52] U.S. Cl.............. 226/91, 29/241, 57/34 R, 57/106, 118/420, 118/DIG. 18
[51] Int. Cl.................................. B65h 57/12
[58] Field of Search.......... 118/506, 420, DIG. 18, 118/DIG. 22; 226/91, 92; 57/34 R, 106; 29/433, 241; 139/381; 81/3 J; 223/1 N, 1 Q; 425/1 N, 1 Q; 264/1 N, 1 Q; 117/114 R, 114 A, 114 B, 114 C, 115

[56] References Cited
UNITED STATES PATENTS

| | | | |
|---|---|---|---|
| 286,731 | 10/1883 | Potter | 139/381 |
| 3,110,430 | 11/1963 | Park | 226/91 |
| 3,174,667 | 3/1965 | Park | 226/91 X |
| 3,239,885 | 3/1966 | Niesse | 118/72 |
| 3,310,865 | 3/1967 | Schelling | 29/241 X |
| 3,357,086 | 12/1967 | Hood | 29/241 |
| 3,359,978 | 12/1967 | Smith, Jr. | 128/214.4 |
| 3,404,433 | 10/1968 | Krutchen et al. | 425/191 X |
| 3,538,584 | 11/1970 | Carpenter et al. | 29/241 X |
| 3,691,744 | 9/1972 | Dubois | 57/58.95 X |

*Primary Examiner*—Morris Kaplan
*Attorney, Agent, or Firm*—E. W. Somers

[57] ABSTRACT

An elongated longitudinally slotted housing having a tapered end extends through a bifurcated end of a handle. The opening between the bifurcated portions of the handle are aligned with the slot in the housing. A knob having a groove formed therein is attached to an end of a longitudinally slotted tubular guide member mounted rotatably within the housing.

An operator grasps the handle, and turns the knob and the tubular member attached thereto to misalign the slot of the tubular member with the housing slot. Strand material is inserted through the knob and pushing forces are applied to move the strand material into the tubular member. Then the operator inserts the tapered end of the housing into an extruder head and feeds the strand material inwardly through the extruder head. Subsequently, the device is withdrawn along the strand material while maintaining the strand material threaded through the extruder head. The tubular member is turned to align the slots and the device moved laterally out of confining engagement with the strand material prior to the operation of the extruder.

The tubular guide member may be replaced with a longitudinally grooved rod. The tapered end of the housing is modified to cooperate with an end of the rod to form a conically-shaped end when the groove is misaligned with the housing slot. At that time, the centerline of the conically shaped end is coincident with the centerline of the groove which is offset from the centerline of the housing. The conically shaped end is designed to mate with the walls of an opening in the extruder head and to align the groove and strand material therein with the extruder head opening.

22 Claims, 11 Drawing Figures

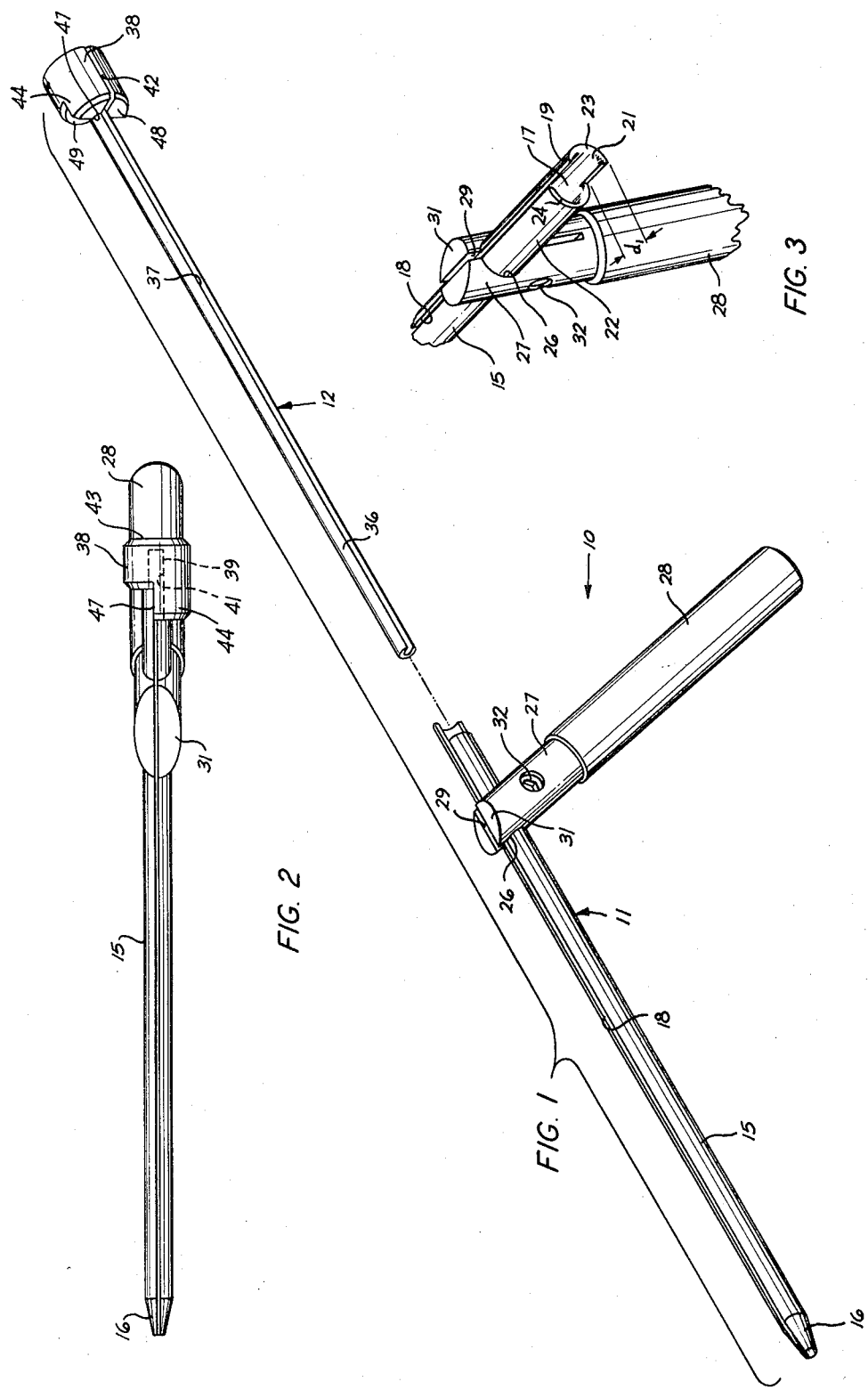

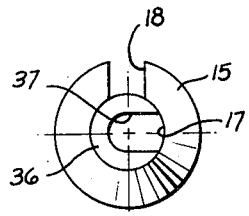
FIG. 4
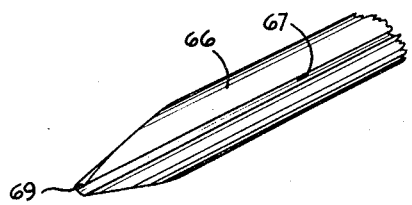
FIG. 5
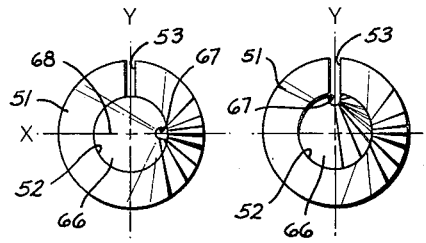
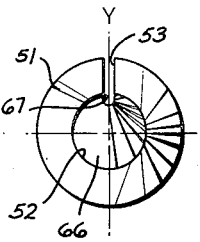
FIG. 7A  FIG. 7B
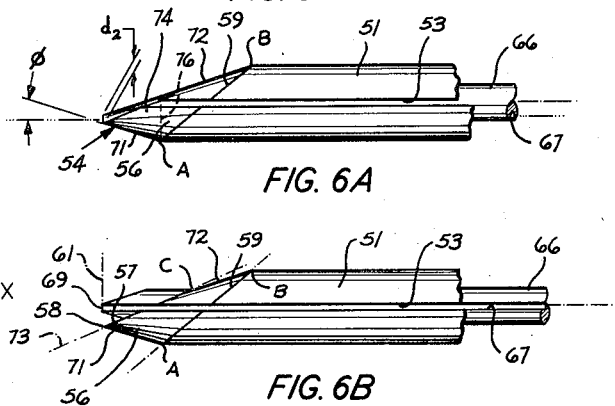
FIG. 6A
FIG. 6B
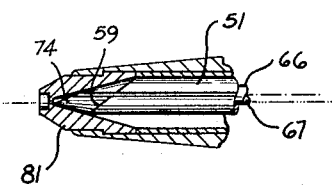
FIG. 8B
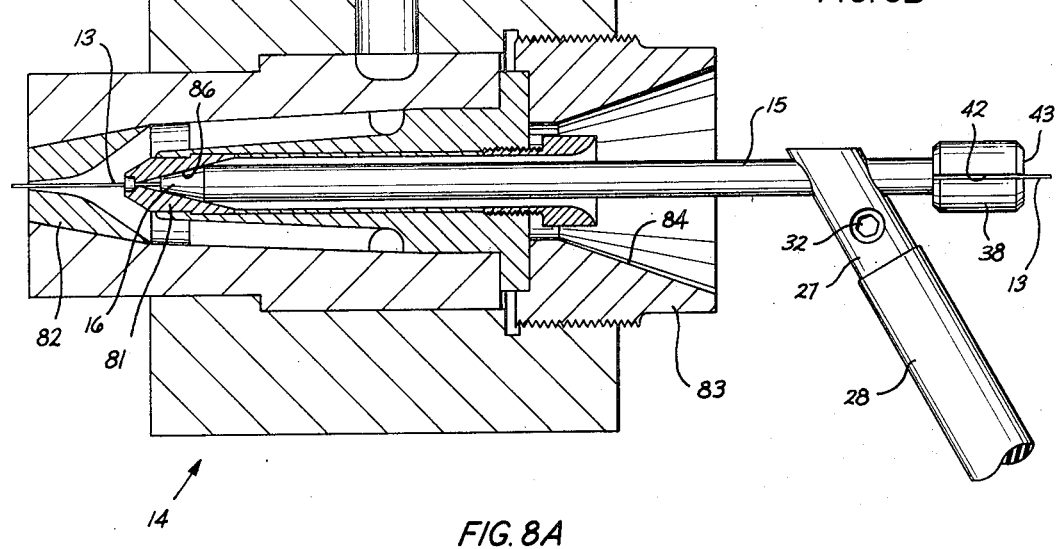
FIG. 8A

STRAND THREADING DEVICE

BACKGROUND OF THE INVENTION

1. Field of the Invention

This invention relates to a device for strand threading, and, more particularly, to a device for stringing up strand material through an extruder of a conductor insulating line.

2. Technical Considerations and the Prior Art

Prior to the extrusion of an insulation material about a wire, the wire is threaded through a core tube and die mounted in an extruder head. Since the openings of the core tube and die are extremely small, difficulties have been encountered by an operator attempting to locate the core tube opening with a leading free end of strand material such as wire. Moreover, the repeated unsuccessful attempts by the operator to locate the core tube opening with the accompanying impact of the leading end of the wire with the portion of the core tube adjacent the opening may cause the leading portion of the wire to be bent. This is especially acute with the softer smaller gauge wires to be insulated, e.g., 26 gauge aluminum.

Desirably, a guide tube is used for guiding the leading end of the wire into the openings of the core tube and die. Such a tube is positioned behind the core tube and extends outwardly from the extruder head to facilitate the threading of the wire through the guide tube, core tube and die. Since the guide tube has the wire passing therethrough, the guide tube must remain within the extruder head during the entire extruding operation. Various particles of dirt and metal, which are on the wire, are carried with the wire toward the core tube. When operating without the guide tube, the accumulation of particles about the wire as the wire enters the core tube opening usually is not objectionable. However, with the presence of the guide tube, which is necessitated by the threading operation, an accumulation of particles at the entry side of the core tube results, whereby jamming of the wire occurs resulting in stretching and breaking of the wire.

In addition, the passing of the wire through the guide tube during subsequent extruding operations results in considerable wear within the guide tube, thereby necessitating frequent replacement of the guide tube. Hence, the problems presented in the utilization of such a guide tube could be overcome if the tube could be removed immediately after the threading operation and prior to the extruding operation.

A removable guide tube for the threading of a strand through apparatus is disclosed in U.S. Pat. No. 3,239,885 issued on Mar. 15, 1966, in the name of Paul J. Niesse. There, a guide tube having a central passage and a tapered end is formed with a helical slot in the outer periphery of the guide tube extending from the tapered end rearwardly to the other end. The helical slot is contiguous with the guide tube.

In use, subsequent to the positioning of the guide tube in engagement with the tapered opening of the core tube, the wire is passed through the central passage of the guide tube and aligned with the openings of the die of the core tube. Thereafter, the wire is pushed through the die and the core tube with two portions of the trailing end bent at right angles. Subsequently, the guide tube is withdrawn axially along the trailing portion of the wire until the rear portion of the helical slot engages a section of the wire extending between the right angle bends.

Then the operator rotates the guide tube so that the portion of the wire extending between the right angle bends is guided through the helical slot relatively toward the tapered end. Eventually, the wire passes completely through the helical slot and the guide tube is removed from the wire.

There has been a desire to improve on the above-identified device in order to string-up the finer gauge wire in a wire and cable manufacturing facility. Also, it is advantageous to have a portable string-up device which does not require complex or intricate machining operations to fabricate.

In another prior art disclosure, see U.S. Pat. No. 3,404,433, there is shown extruder coating equipment which includes facilities for holding filaments of a textile material to be coated in spaced relationship during coating. A guider tip includes a mandrel having a plurality of longitudinal grooves and being received in a sleeve. The sleeve may be formed with a longitudinal slot so that the filaments are individually successively placed in the slot and thence into an aligned one of the grooves in the mandrel. After a filament is positioned in one of the grooves, the sleeve is turned so as to be aligned with the next one of the grooves.

Then the mandrel and the sleeve are inserted into an outer housing and the outer housing turned threadably into a guider tip holder which is secured into an extruder housing by bolts. A nozzle housing is bolted to the extruder housing about the outer housing with an extrusion nozzle turned threadably into the nozzle housing. The mandrel and sleeve maintain the filaments in a predetermined spacing during the extrusion process.

SUMMARY OF THE INVENTION

It is an object of this invention to provide a device for strand threading.

It is also an object of this invention to provide a device for threading any one of a plurality of different gauge bare wires through an extruder in a conductor insulating line.

It is a further object to provide a simplified device which is readily portable for use in stringing-up an extruder in a plastic insulating line and which may be removed from the extruder prior to commencing the operation of the line.

A device for threading strand material through an opening in an apparatus includes a guide member having an opening cut longitudinally therethrough for containing a section of the strand material, facilities mounted on the guide member and selectively moveable between at least one position for covering laterally the opening and another position for exposing laterally the opening, facilities for supporting rotatably the guide member and the covering means to permit relative motion to be caused between the guide member and the covering facilities to cause the covering facilities to assume the one position to cover laterally the opening and to confine a section of the strand material moved into the guide member, the supporting facilities having a path communicating an external surface thereof with the opening when the opening is uncovered, the guide member extending from the supporting facilities to permit the guide member to be inserted into the apparatus and into alignment with the opening thereof while maintaining the guide member and covering facilities in an opening-closed position to facilitate the application of forces to the strand material to thread successive sections thereof through the apparatus and to permit subsequently the withdrawal of the device from engagement with the apparatus and along the strand material while maintaining the strand material threaded through the apparatus, the withdrawal of the device from engagement with the apparatus permitting relative motion to be caused between the guide member and the covering facilities to cause the covering facilities to assume the other position to uncover the opening and permit the device to be moved laterally of the strand material.

Other objects and features of the present invention will be more readily understood from the following detailed description of specific embodiments thereof when read in conjunction with the accompanying drawings.

BRIEF DESCRIPTION OF THE DRAWINGS:

FIG. 1 is an exploded view in and having of a portable device of one embodiment embodying the principles of this invention for threading strand material through an extruder and which is removable from engagement with the extruder prior to operation thereof;

FIG. 2 is a plan view of the device in FIG. 1 which includes a first subassembly and a second subassembly in an assembled condition mounted for rotation relative to each other;

FIG. 3 is an enlarged view in perspective of an end stepped portion of a housing of the first subassembly and a handle in which the housing is mounted;

FIG. 4 is an end view of the housing in FIG. 3 with a tubular guide member of the first subassembly mounted rotatably therein as viewed from that end of the device which is inserted into the extruder;

FIG. 5 is a view in perspective of a portion of a guide member of a first subassembly of another embodiment constructed in accordance with the principles of this invention;

FIGS. 6A and 6B are plan views of the portion of the guide member shown in FIG. 5 mounted for rotation in a housing between strand-threading and strand-disengagement positions respectively, with the guide member as shown in FIG. 6B being displaced longitudinally from an actual position for purposes of clarity;

FIGS. 7A and 7B are end views of the device shown in FIGS. 6A and 6B, respectively, and taken along lines 7A—7A and 7B—7B thereof; and FIGS. 8A–8B are views of the device in engagement with the extruder to facilitate threading of the strand material therethrough.

DETAILED DESCRIPTION

Referring now to FIG. 1, there is an exploded view of a portable strand threading device embodying certain features of this invention and designated generally by the numeral 10. The strand threading device 10 includes a first subassembly, designated generally by the numeral 11, and a second subassembly, designated generally by the numeral 12, which are adapted to be assembled together to permit an operator to thread a section of a strand material 13 (see FIG. 8A) through an extrusion apparatus, designated generally by the numeral 14.

The first subassembly 11 includes an elongated cylindrically shaped housing 15 having a tapered end 16 and having a bore 17 extending therethrough. A longitudinally extending slot 18 is cut through the housing 15 and the tapered end 16. Of course, the dimensions of the device 10 are selected to insure that the tapered end 16 will be received in generally mating engagement with the walls of an opening of extrusion equipment on the line to be threaded.

Another end 19 of the housing 15 is formed to facilitate mounting of the second subassembly 12 with the first subassembly 11. The other end 19 is stepped and formed with one generally semi-circular portion 21 of the housing 15 as determined by a plane through the longitudinal center line of the slot 18 and the longitudinal axis of the housing extending a predetermined distance $d_1$ beyond the other generally semi-circular portion 22 of the housing. Moreover, the junction of the inwardly facing surface of the housing 15 and end faces 23 and 24 of the portions 21 and 22, respectively, are rounded or flared to facilitate entrance of a leading end of the strand material 13 as will hereinafter be described.

The housing 15 is mounted in a bore 26 formed through a bifurcated rod 27 that is attached to and extends from a handle 28 (see FIGS. 1 and 3). During use of the device 10, the housing 15 is in engagement with portions of a manufacturing line, which may be at an elevated temperature. In order to insulate the operator from these high temperatures, the handle 28 is made from a TEFLON material. Moreover, the bore 26 is formed through the rod 27 so that the axis of the housing 15 mounted in the rod is skewed to the axis of the rod and the handle 28 (see FIGS. 1 and 2).

As will become apparent, it is necessary in the use of the device 10 that a portion of the strand material 13 is caused to be passed laterally through the slot 18 in the housing 15. In order to facilitate the passage of the portion of the strand material 13 therethrough when the housing 15 is mounted in the bore 26 of the rod 27, the bifurcated rod 27 is formed, so that an opening 29 (see FIGS. 2 and 3) formed between the bifurcations extending through an upper end 31 of the rod is aligned with the slot 18 in the housing 16. The bifurcated portions of the rod 27 may be urged toward each other by a fastener 32 turned threadably therethrough to hold the housing 15 within the bore 26. Of course, the fastener 32 may be turned to permit adjustment of the position of the rod 27 along the housing 15.

The second subassembly 12 is adapted to be mated with the first subassembly 11 and to cooperate therewith to permit threading of the strand material 13 therethrough and then through the extruder head 14 (see FIG. 8A), and the removing of the device 10 from the extruder head at the conclusion of the threading operation. As can best be seen in FIGS. 1 and 4, the second subassembly 12 includes a tubular member 36 having a circular crosssectional shape and being of a diameter such that the tubular member may be mounted rotatably in the housing 15, Also, the tubular member 26 has a slot 37 formed longitudinally thereof. The width of the slot 37 is essentially equal to the width of the slot 18 in the housing 15 to permit unobstructed passage of a section of the strand material 13 therethrough. The width of the slots 18 and 37 is large enough to accommodate the outside diameter of the largest gauge strand material 13 contemplated to be threaded with the device 10.

It should be apparent that the tubular member 36 be sized to accommodate a section of the strand material 13 therewithin. There may be merit in having a device 10 on each line for each gauge of strand material 13 to be used on the line rather than to size the tubular member 36 to accept any such gauge.

The second subassembly 12 also includes a knob 38 (see FIGS. 1 and 2), constructed from a TEFLON material and attached to the tubular member 36. The knob 38 may be attached to the tubular member 36 by any of a variety of well known arrangements. For example, the knob 38 may have a stepped opening (not shown) formed therethrough with an end 39 of the tubular member being reduced in diameter. The tubular member 36 is force-fitted into the stepped opening in the knob 38 with the reduced diameter portion of the tubular member extending through the small diameter portion of the stepped opening and headed to further hold the tubular member within the knob.

In the alternative, and as is shown in FIG. 2, the knob 38 may be formed with a cavity 41 for receiving the end 39 of the tubular guide member 36. Further, in this arrangement, the end 39 of the tubular guide member 36 is pinned within the knob 38.

The knob 38 also has a slot 42 cut therethrough and aligned with the slot 37 of the tubular member 36 when the knob is assembled with the tubular member. It should be noted that the bottom of the slot 42 in the portion of the knob 38 between the end 39 of the tubular member 36 and an end 43 (see FIG. 2) of the knob is aligned with the bottom of the slot 37 in the tubular member. Also, as can be seen partially in FIG. 1, the tubular member 36 is open-ended to expose the inner chamber thereof at the ends thereof as well as laterally through the slot 37 when the slot is uncovered.

Finally, the knob 38 is constructed with a stepped end to facilitate mating thereof with the stepped end 19 of the housing 16 (see FIG. 2). The stepped end of the knob 38 has a generally semi-circular depending portion 44 (see FIGS. 1 and 2) extending from the main portion of the knob. It should also be observed from FIG. 1 that slot 42 is formed transversely of the portion 24 of the knob 38. Of course, the portion 44 has a generally semi-circular trough which is a continuation of a portion of the cavity 41 for supporting a generally semi-circular portion of the tubular member 36.

The device 10 is assembled by inserting the tubular member 36 into the housing 15 and rotating the knob 38 to cause a diametrical face 47 of the depending portion 44 of the knob to be aligned with the longitudinal edge portions of the extending other end 19 of the housing. Relative motion is caused between the first and second subassemblies 11 and 12, respectively, longitudinally of the axis of the housing 15 to cause the tubular member 36 to be moved slidably in engagement with the longitudinal edge portions of the end 19 of the housing. The movement is continued until the end face 24 of the housing 15 (see FIG. 3) is in engagement with an end face 48 of the depending portion 44 of the knob 38 and with the end face 23 of the housing 15 engaging an end face 49 of the knob (see FIG. 2).

Moreover, the slots 37 and 42 are formed in the tubular member 36 and in the knob 38, respectively, to provide automatic alignment of the slot 18 in the housing 16 with the slot 37 in the tubular member. When the end face 48 of the knob 38 is in engagement with the end face 24 of the housing 15, the slots 37 and 18 are misaligned and the interior of the tubular member 36 is covered to confine a section of the strand material 13 therein. When the end face 48 of the knob is in engagement with the end face 23 and in a predetermined rotational orientation with respect thereto, the slots 37 and 18 are aligned and the interior of the tubular member is exposed.

While the device 10, as described hereinbefore, may be suitable in most instances of contemplated use, situations may arise, especially in the manufacture of fine gauge conductor wire, when certain modifications may prove beneficial. As can be seen in FIG. 4, the slot 37 in the tubular member 36 communicates with the chamber through the tubular member. The distance between the inwardly facing surface of the housing 15 and the innermost portion of the chamber of the tubular member is substantially greater than the diameter of the finer gauge strand material 13 expected to be threaded therethrough. With this arrangement, the possibility exists that when threading the finer gauge strand material 13 through the tubular member 36, the strand material may tend to buckle within the chamber thereof. This may lead to difficulties in moving the leading end of the strand material 13 into the extruder head 14.

Of course, the tubular member 36 may be chosen so that the chamber thereof is sized closely to that of the fine gauge strand material 13. The torsional strength of such a member, especially after having the slot 37 cut therein is inadequate to resist torsional forces which may be expected to be imparted thereto during use of the device 10. These may occur when an operator attempts to turn the tubular member 36 relative to the housing 16 and encounters resistance caused by partially solidified plastic material in portions of the extruder head 14.

In order to overcome the above-described potential problem, portions of the device 10 may be modified as shown in FIGS. 5–7. It should be noted that the modifications involve only the tubular member 36 and the housing 15. In designating the modifications, new numerals will be used in FIGS. 5–7 where appropriate. All other elements of the device 10 remain as before with the same numeric designation.

A housing 51 (see FIGS. 6A and 7A) is similar to the housing 15 with only the end 16 being modified. The modified housing 51 includes a bore 52 formed therethrough and also a slot 53 formed longitudinally of the housing. The slot 53 communicates the external surface of the housing with the bore 52.

An end 54 of the housing 51 is truncated to be in the form of a frustum 56 of an oblique cone. The frustum 56 is formed with a base 57 intersecting an end point of the housing 51 and with an imaginary base 59. The bore 52 of the housing 51 opens to the plane 57. The end face 58 of the housing 51 lies in a plane 61 (see FIG. 6B) normal to the axis of the housing 51. As will become evident from an examination of the drawings and the further description to follow, the bases 57 and 59 of the frustum 56 are parallel only in a limiting condition. The frustum 56 is formed so that at least portions of the curved surface thereof mate with entrance wall portions of the opening of the extruder head to be threaded.

It is important to the use of the modified device 10 that the slot 53 in the housing 51 may be formed in any one of a number of locations about the periphery of the housing. Accordingly, the location of the slot 53 need not be removed by at least ninety degrees from that portion of the housing 51 which intersects the base 57, at the leading portion of the end 54.

The second subassembly 12 is modified to replace the tubular guide member 36 with a guide member 66 in the form of a rod (see FIGS. 5 and 6A-6B. In order to facilitate the threading of sections of the strand material 13 with the modified device 10, the guide member 66 has a slot 67 in the form of a groove formed longitudinally linearly in the surface thereof. The groove 67 may be dimensioned to receive the largest gauge of strand material 13 expected to be threaded through the extruder head 14 therewith, or alternatively, may be sized to a particular gauge. In a groove 67 sized to a specific gauge, the strand material 13 is confined within dimensions approximating the outside diameter thereof. This prevents any possible buckling of the strand material 13 during the threading operation.

The guide member 66 has one end thereof attached to the knob 38, as hereinbefore described, with respect to the tubular member 36. The other end of the guide member 66 is designed to cooperate with the end 52 of the housing 51 to form a configuration adapted to the threading operation. As can best be seen in FIGS. 5, 6A and 6B, the other end of the guide member 66 is tapered. A longest element 68 of the tapered portion extends from an end face 69 rearwardly toward the knob 38 and intersects the untapered peripheral surface of the guide member 66 at a point diametrically opposite to the centerline of the groove 67. The taper is formed in each rotational direction from the element 68 toward the portion of the guide member 66 in which the groove 67 is formed. The line of intersection of the peripheral surface of the guide member 66 with the curved surface of the tapered end extends from the intersection of the element 68 with the peripheral surface of the guide member bidirectionally toward the end face 69 of the guide member adjacent the intersection of the groove 67 with the end of the guide member.

The position of the guide member 66 with respect to the housing 51 in the strand-disengagement position may be observed from FIG. 6B. In the strand-disengagement position, the groove 67, in the guide member 66 is aligned with the slot 53 in the housing 51. As can be seen in FIG. 6B, the groove 67 is aligned with the slot 53 in the housing 51 with the tapered end of the guide member protruding transversely of the plane 58. The drawing in FIG. 6B shows the end of the guide member 66 lying in the plane 61 as is the end of the housing 51. However, this illustration is for purposes of clarity; the device 10 is constructed so that when the guide member 66 is in the strand-disengagement position shown in FIG. 6B, the end face 48 of the knob 38 is in engagement with the end face 23 of the housing 15. By necessity, the end of the guide member 66 as shown in FIG. 6B is withdrawn by the distance $d_1$ from the end of the housing 51.

In order to describe the frustum 56 of the cone at the end 54 of the housing 51, the steps in the construction thereof will be enumerated. Referring now to FIG. 6A, the guide member 66 is shown in the strand-receiving strand-threading position with respect to the housing 51. The groove 67 is displaced approximately ninety degrees from the slot 53 in the housing 51. At this time of course, the unformed ends of the guide member 66 and the housing 51 lie in the plane 61. Then a pin (not shown) is inserted into the groove 67 and the housing 51 and guide member 66 are turned as a unit about the center line of the pin in a shaping apparatus (not shown), the center line of the pin being coincident with the centerline of the groove 67. The frustum 56 of a cone is thereby formed with the centerline of the surface generated being the centerline of the groove 67. The cone is constructed so that side elements thereof form an angle $\phi$ with the centerline of the cone. Of course, the shaping of the cone includes the shaping of the end of the guide member 66 to the shape hereinbefore described.

The imaginary base 59 of the frustum 56 extends obliquely of the housing axis and intersects a side element 71 at a point designated A at the intersection of the side element and the untapered peripheral surface of the housing 51. The imaginary base 59 intersects also the untapered portion of the housing 51 at a point designated B. The point B is located so that another side element 72 diametrically opposed to the side element 71 and as extended joins the point B and the apex of the cone making the angle $\phi$ with the axis of the cone.

The element 72 intersects the wall of the bore 52 at a point designated C. A plane 73 drawn through the point C and the end 58 represents the top plane of cutoff of the frustum 56 and in the usual construction is not parallel to the base 59. The intersection of the element 72 as extended toward the apex of the cone with the plane 61 is spaced a distance $d_2$ from the end of the element 71 (see FIG. 6A).

As a frame of reference to X–Y planes (see FIGS. 7A and 7B), the X plane can be considered as containing the longitudinal axis of the housing 51. The Y plane contains the longitudinal axis of the housing 51 and extends normal to the X plane and through the center of the slot 53.

Also of importance is that when the end 54 of the housing 51 and the guide member 66 are shaped as hereinbefore described, a frustum 74 of a right circular cone is generated about the centerline of the groove 67. As can best be seen in FIG. 6A, the frustum 74 has an imaginary base 76 and side elements 71—71. The other base of the frustum lies in the plane 61 through the end 58 of the housing 51. As can best be seen in FIG. 8B, it is the curved surface of the frustum 74 that mates with the walls of the opening to the extruder head 14.

It is important to realize that the centerline of the groove 67 and hence of the frustum 74 of the right circular cone is displaced from the centerline of the housing 51 and hence of the device 10. In use, this causes the centerline of the device 10 to be offset from the centerline of the path of the strand material 13. The amount of offset may be reduced by reducing the rotational displacement of the groove 67 in the strand-threading cone generating position from the slot 53 in the housing. This rotational displacement need not be the 90° shown in FIG. 7A.

This arrangement insures that although a rodlike member is grooved longitudinally along the surface thereof to receive a section of the strand material, that the end of the modified device 10 which is received into the extruder head 14 facilitates the threading operation. The frustum of the right-circular cone is always formed with the strand-receiving passage formed by the inner wall of the housing 51 and the walls of the groove 67 being generally concentrically disposed about the centerline of the cone. Moreover, the surface of generation of the cone is formed to mate with the walls of the opening in the extruder head 14. In this way, the strand-receiving passage is aligned with the opening in the extruder head 14.

In a device embodying the principles of the modified device, the housing 51 has an outside diameter of 0.25 inch and an inside diameter of 0.125 inch. The groove 67 in the guide member 66 has a depth of 0.040 inch which is adequate to accommodate gauge sizes ranging from 19 to 26 AWG. Of course, 25 gauge wire being only 0.0159 inch in diameter may undulate within the 0.040 inch deep groove. With that fine gauge, it may prove advantageous to form a custom sized groove. The right circular cone formed with the imaginary base 74 has a surface generated by an element which makes an angle of approximately 15° with the axis of the cone and hence the axis of the housing 51.

In a limiting condition mentioned hereinbefore, the planes 57 and 59 may be generally parallel. This occurs when the depth of the groove 67 is slightly less than the diameter of the guide-member 66.

USING THE EMBODIMENTS OF THE STRAND THREADING DEVICE

In operation, the knob 38 and the tubular member 36, which comprise the second subassembly 12, may be turned rotatably as a unit relative to the first subassembly 11. During the use of the device 10, the rotation of the second subassembly 12 with respect to the first subassembly 11 is only required insofar as is necessary to misalign the slot 37 of the tubular member 36 with the slot 18 of the housing 15. Also, as may be seen in FIG. 2, when the second subassembly 12 is assembled with the first subasssembly 11 in a strand-threading condition, the end of the tubular member 36 does not extend beyond the tapered end 16 of the housing 15.

The device 10 is used to thread the strand material 13 through the extruder head 14 (see FIG. 8A) and more specifically through a core tube 81 and a die 82 thereof. An externally threaded nut 83 is threadably fastened to the extruder head 14 to clamp the core tube 81 in the position illustrated in FIG. 8A. The nut 83 may be formed with a central opening 84 for receiving the device 10 such that the device fits snugly in mating engagement with the walls of a tapered opening 86 of the core tube 81.

It should be noted that in extrusion apparatus of current and proposed design, there is a trend toward the mounting of the core tube 81 more interiorly of the extruder head 14 than in the past. The elongated profile of the device 10 is especially useful in apparatus of this design where threading by conventional methods such as visual alignment and the attempt to insert the leading end of the strand material 13 into the core tube 81 without the use of guiding facilities is not feasible.

Prior to the insertion of the device 10 into the extruder head 14, the operator grasps and holds the handle 28 and then with the other hand grasps and turns the knob 38. Since the knob 38 is attached rigidly to the tubular member 36, the turning of the knob turns the tubular member relative to the housing 15. The turning is continued until the face 48 of the knob 38 is aligned with the end face 24 of the housing 15. Then the operator causes relative longitudinal movement between the first subassembly 11 and the second subassembly 12 to slide the flat diametrical face of the portion 44 of the knob along the length of $d_1$ of the portion 19 of the housing 15 until the end face 49 is engaged with the end face 23 of the housing 16 and until the end face 48 of the knob engages the end face 24 of the shorter portion of the housing 15. At that time, the slot 18 in the housing 15 is misaligned with the slot 37 in the tubular member 36 (see FIG. 4).

Then the operator, while holding the device 10 with the slot 37 in a covered, strand-threading position, moves a leading portion of the strand material 13 angularly laterally into and through the slot 42 in the knob 38 and into the covered portion of the slot 37 of the tubular member 36. The rounded or flared portions of the end face 24 of the portion 21 of the housing may be of assistance in guiding the leading end of the strand material 13 into the slot 37.

In the next step of the method of use of the device 10 in which the leading end of the strand material is aligned into the slot 42, the operator pivots the strand material 13 into the slot in the knob 38. The strand material is caused to be received in the portion of the slot 37 of the tubular member 36 within the knob and back through the remaining slotted portion of the knob. Then the operator applies forces in the manner described hereinbefore in a first direction to the strand material 13 to push successive sections of the strand material into and through the tubular member 36 until a leading end of the strand material protrudes beyond the tapered end 16 of the housing 15. At that time, the operator applies forces in a direction opposite to the first direction to withdraw the leading end slightly into the tubular member 36.

While holding the device 10 and at least the section of strand material 13 in the device so as to prevent unintended relative motion therebetween, the operator advances the device through the opening 84 in the nut 83 until the tapered end engages the walls of the opening 86 of the core tube 81 (see FIG. 8A). Then the operator applies pushing forces to the strand material 13 to urge sections of the strand material through the extruder head 14.

As the leading end of the strand material 13 is held and pulled down the line, the operator acts to disengage the device 10 from the path of travel of the strand material. The device 10 is withdrawn axially of the strand material 13 back through the opening 84 of the nut 83 until the device 10 is disengaged from the extruder head 14 while maintaining the strand material threaded through the extruder head 14. Then the operator, while holding the handle 28, grasps the knob 38 and causes relative motion between the first and second subassemblies 11 and 12, respectively, until the end face 48 is displaced the distance $d_1$ from the face 24 of the housing 15. Then, the operator turns the knob 38 through approximately 90° until the end face 48 of the knob engages the end face 23 of the elongated semi-circular portion 21 of the housing 15 and aligns the slots 18 and 37 whereafter the device 10 is moved relatively laterally of the strand material 13.

At times, the extruder head 14 may be at a very high temperature, say 400°F. Should the operator use the device 10, which is pocket-size, perhaps not over 6 inches in length, and at ambient temperature of say 70°F., to thread the strand material 13 through the extruder head 14, the relatively cool, tapered end 16 may not be immediately forcible through the plastic material in and around the core tube 81. To overcome this, the operator may support the housing 15 of the tool on the heated external surface of the apparatus between usages thereof.

In using the modified strand-threading device 10, the steps of a method embodying certain principles of this invention are generally similar to those outlined in using the device 10. Initially, the modified device 10 is assembled with the guide member 66 mounted rotatably within the housing 51 with the end face 48 of the depending portion 44 of the knob 38 engaging the end face 24 of the stepped end 21 of the housing 51. In this strand-threading position, the guide member 66 is oriented as shown in FIG. 6A with respect to the housing 51 so that the groove 67 is displaced ninety degrees with respect to the slot 53 (see FIG. 7A).

The next step of the method requires the confining of a section of the strand material 13 within the groove 67 between the walls of the groove and the inwardly facing surface of the housing chamber. The operator inserts the leading end of the strand material 13 angularly laterally of the slot 42 in the knob 38 into the groove 67 and applies pushing forces to the material to move the leading end thereof beyond the tapered end 69. Then the operator withdraws the leading end slightly within the guide member 66. Next, the operator inserts the leading end of the modified device into the extruder head 14 to engage the surface of the frustum of the right-circular cone (see FIG. 6B) end of the device with the mating surface of the core tube 81.

It should be noted that whatever the size of the groove 67 in the guide member 66, the groove generally will be aligned with the centerline axis of revolution of the small cone formed between portions of the tapered end of the housing 51 and the tapered end of the guide member. The enlarged opening in the nut 83 and the portions of the extruder head 14 upstream of the core tube 81 permit the device to be manipulated to engage the frustum of the right circular cone with the walls of the opening to the core tube regardless of the particular gauge size tool being used. It will be recalled that the size of the right circular cone varies slightly as between different gauge size tools; the slope of the side elements remains generally constant.

After the strand material has been threaded through the extruder head 14, the operator disengages the device from the extruder head and moves the device rearwardly axially of the strand material. Then the operator while holding the handle 28, grasps the knob 38 and moves the second subassembly longitudinally rearwardly until the end face 48 of the knob is aligned with the end face 23 of the portion 21 of the stepped end of the housing whereupon the operator rotates the knob and guide member to the strand-disengagement portion shown in FIGS. 6B and 7B.

The question may be raised as to why the above-described threading procedure does not involve manipulating the device to align the slots 18 and 37 and then moving, laterally of the device, a section of the strand material 13 through the alinged slots into the tubular member 36. This procedure falls within the spirit and scope of the invention but may not be practical in manufacturing operations. If the portion of the strand material 13 was perfectly linear in all cycles of threading, this procedure could very well be adopted. However, since the strand material 13 tends to have various curvatures therein, the movement of a section thereof through the aligned slots 18 and 37 may result in a portion of the section protruding into the slot 37 or into the slots 18 and 37.

Should this occur, the subsequent attempted turning of the second subassembly 12 relative to the first subassembly 11 may be obstructed by the protruding portion of the strand material 13 causing a breakage or disassembly of one or more of the elements. For this reason, it may be advisable to construct at least the tubular member 36 from a steel material rather than a more easily machinable brass material. The use of dissimilar materials for the tubular member 36 and the housing 15 is also preferable to prevent seizure between these elements.

Of course, it is within the scope of this invention to have the operator use the device 10 in at least one other fashion to thread the strand material through the device. The operator misaligns the slots 18 and 37 and inserts a leading end of the strand material 13 into the portion of the slot 42 of the knob 38 which opens to the end face thereof adjacent the end of the knob opposite the housing 15. Subsequently, the operator applies pushing forces to the strand material 13 and proceeds to thread the strand material through the device 10. This may best be accomplished by using a pair of needle-nozed pliers. An attempt to use hand-applied forces directly to the strand material 13 may prove unsuccessful since there may be a residue of plastic compound within the core tube 81 which resists movement of the wire therethrough. Hand pushing, especially of finer gauge wires, may result in the fingers slipping along the sections of the strand material.

It is to be understood that the above-described arrangements are simply illustrative of the principles of the invention. Other arrangements may be devised by those skilled in the art which will embody the principles of the invention and fall within the spirit and scope thereof.

What is claimed is:

1. A device for threading strand material through an aperture in an apparatus, and removable from engagement with the apparatus prior to the operation of the apparatus, which includes:

an elongated guide member having an opening formed longitudinally therethrough, which communicates with the surface thereof, and which is capable of receiving a section of the strand material;

means oriented in at least one position relative to the guide member for covering laterally the opening in the guide member to confine a section of the strand material moved into the opening in the guide member and in one other position for uncovering laterally the opening in the guide member to permit passage of a section of the strand material therethrough; and means for supporting the guide member and the covering means to permit relative movement therebetween, the supporting means having a path communicating an external surface of the supporting means with the opening in the guide member when the guide member is uncovered to facilitate passage of a section of the strand material from the guide member out of engagement with the device;

the supporting means being such that the guide member extends therefrom to permit the guide member to be inserted into the apparatus and into alignment with the aperture thereof while maintaining the guide member and covering means in an opening-covered position to facilitate the application of forces to the strand material to thread successive sections thereof through the apparatus and to permit subsequently the withdrawal of the device from engagement with the apparatus and along the strand material while maintaining the strand material threaded through the apparatus;

the portion of the guide member inserted into the apparatus being formed to align the opening with the aperture in at least the opening-covered position;

the withdrawal of the device from engagement with the apparatus permitting relative motion to be caused between the guide member and the covering means to uncover the opening and permit the device to be moved laterally of the strand material to cause the strand material to be passed through the opening and the path of the supporting means while the strand material is maintained threaded through the apparatus.

2. A device for threading strand material through an opening in an apparatus, and removable from engagement with the apparatus prior to the operation of the apparatus, which includes:

a longitudinally-slotted open-ended guide member, the slot thereof capable of receiving a section of the strand material therein;

slotted means for receiving the guide member to permit relative movement therebetween from at least one position with the slots misaligned to confine a section of the strand material which has been moved into the guide member to another position with the slots aligned to permit passage of the section of the strand material through the slots; and means for supporting the guide member and the receiving means to permit relative motion therebetween, the supporting means having an opening formed therein and communicating with the slot in the guide member when the receiving means is in the one position to provide a path for moving the device laterally of the section of the strand material while the strand material is strung through the apparatus;

the supporting means being such that the guide member extends substantially therefrom to permit the guide member to be inserted into the apparatus and into engagement with the walls of the entrance to the opening thereof while maintaining the guide member and receiving means in a slot-closed position to facilitate the application of forces to the strand material to thread successive sections thereof through the apparatus and to permit subsequently the withdrawal of the device from engagement with the apparatus and along the strand material while maintaining the strand material threaded through the apparatus;

the portions of the guide member and the receiving means inserted into the apparatus being formed to align the slot in the guide member, in at least the slot-closed position, with the opening of the apparatus to be threaded;

the withdrawal of the device from engagement with the apparatus permitting the relative motion to be caused between the guide member and the receiving means to uncover the slot and permit the device to be moved laterally of the strand material.

3. A device for threading strand material through an apparatus, the device being removable from the apparatus prior to the operation of the apparatus, which includes:

a first elongated open-ended hollow member having a cross-sectional area sufficient to receive the strand material and having a slot cut longitudinally therein;

a second elongated open-ended hollow member adapted to receive the first hollow member with the outwardly facing surface of the first hollow member being in rotary sliding engagement with the inwardly facing surface of the second hollow member and having a slot cut longitudinally thereof and having an end adapted to be seated in engagement with the walls of an entrance portion of an orifice of the apparatus to be threaded;

the slots of the first and second members having a width sufficient to permit the strand material to be passed therethrough;

the first elongated member mounted in the second elongated member capable of being rotated therein from a first position in which the slots are aligned to a second position in which the slots are misaligned to preclude moving of the device laterally and spaced from the portions of the strand material; and a knob attached to one end of the first member having an opening formed radially therethrough aligned with and communicating with the slot cut through the first hollow member for turning the first member relative to the second elongated member to misalign the slots and confine a section of the strand material, a leading portion of which is moved into the first elongated member;

the opening formed radially through the knob being exposed when the slots are misaligned to permit a leading section of the strand material to be inserted through the opening and into the aligned slot of the first elongated hollow member;

the alignment of the end of the second hollow member of the device with the orifice facilitating the threading of successive sections of the strand material therethrough whereafter the device may be moved axially longitudinally of the strand material and the first elongated member turned rotatably with respect to the second elongated member to align the longitudinal slots and permit moving the device laterally of the path of travel of the wire;

whereby the device may be removed from the apparatus and the strand material prior to the operation of the apparatus.

4. A device for threading strand material through an opening in an apparatus and capable of being disengaged from the apparatus prior to the operation of the apparatus, which includes:

a first supporting member having a bore formed therethrough and having a slot cut radially of the bore communicating the exterior of the member with the bore;

an elongated housing extending from the first member and having a passage formed therethrough with a longitudinally extending slot aligned with the slot through the first member;

a second supporting member having a slot formed therethrough and communicating the bore of the second member with the exterior surface of the second member; and a tubular member mounted rotatably within the housing and having one end thereof attached to the second supporting member within the slot thereof;

the tubular member and the second member mounted for rotation independently of the first member between a strand-receiving stand-threading position and a strand-disengagement position;

the slots of the first and second members being misaligned when the second member is in the strand-receiving position relative to the first member and the slots being aligned when the second member is in the strand-disengagement position relative to the first member;

the housing having a flared entrance to the bore at one end thereof adjacent the second supporting member;

the tubular member having a longitudinally extending slot aligned with the slot in the second member;

the slots in the housing and in the tubular member having a width sufficient to permit passage therethrough of a section of the strand material;

the slot of the tubular member being covered by the housing when the second member is in the strand-threading position to facilitate inserting a leading end of a section of the strand material angularly of the device into the flared opening and threading the strand material through the device and the apparatus;

the slot of the tubular member being aligned with the housing slot when the second member is in the strand-disengagement position to facilitate causing the strand material to be moved laterally of the device subsequent of the threading of successive sections of the strand material through the apparatus to facilitate moving the device from confining relationship with the strand material.

5. A device for threading strand material through a core tube of an extruder, and capable of being disengaged from the extruder prior to the operation of the extruder, which includes:

a tubular member adapted to receive a section of the strand material therein and having a slot cut longitudinally thereof parallel to the axis of the tubular member, the slot having a width sufficient to permit passing the strand material laterally therethrough;

a knob attached to the outer surface of one end portion of the tubular member having an opening formed therethrough and aligned with the slot of the tubular member and communicating the slot of the tubular member with the surface of the knob;

a housing for receiving and mounting rotatably the tubular member and having a slot cut longitudinally thereof, the slot being substantially of the same width as the slot in the tubular member, the housing further having one end thereof tapered to seat with the walls of the opening of the core tube of the extruder to align the bore of the tubular member with the core tube;

a bifurcated handle having a bore cut therethrough and fitted over the other end of the housing to facilitate an operator holding of the device in engagement with the extruder with the operator spaced from the higher temperature portions of the extruder adjacent the path of travel of the strand material, the bifurcated portions of the handle capable of being urged toward one another to secure the housing therewithin;

means for urging the bifurcated portions of the handle toward one another; and means formed on the knob and the housing for defining one position to which the tubular member and the knob are capable of being turned as a unit in which the slot of the tubular member is aligned with the slot of the housing and at least one other position wherein the slots are misaligned;

the opening to the housing adjacent the knob being rounded to facilitate the insertion of a leading end of the strand material into and through the slot of the tubular member when the slots are misaligned;

the assembly of the tubular member with the housing with the slots misaligned facilitating the movement of the device and the section of the strand material therein without relative movement therebetween into seating engagement with the core tube to permit threading of the strand material through the extruder and the withdrawal of the device out of engagement with the extruder and rearwardly along the strand material subsequent to the threading while the strand material is maintained threaded through the extruder;

the alignment of the slots permitting the device subsequent to withdrawal of the device from engagement with the extruder to be moved laterally of the strand material prior to operation of the extruder.

6. The device of claim 5, wherein the means for defining the one and the other positions of the tubular member and the knob includes:

the one end of the housing being stepped such that one longitudinal segment of the housing as defined by a plane through the slot extends beyond the other half segment thereof;

the knob being formed with a stepped end adjacent the stepped end of the housing such that the elongated portion of the knob overlaps and engages the shortened portion of the housing at the stepped end thereof.

7. The device of claim 5, wherein the knob and at least portions of the handle being made from a temperature-resistant material to facilitate an operator holding the device and turning the knob and tubular member while grasping the device to hold the housing relatively stationary and for holding the parts to maintain the slots misaligned during the threading.

8. The device of claim 5, wherein the inside diameter of the tubular member is slightly greater than the outside diameter of the strand material to be threaded therethrough.

9. The device of claim 5, wherein the inside diameter of the tubular member is slightly greater than the outside diameter of the largest gauge strand material expected to be threaded through the extruder.

10. A device for stringing up a strand material through an extruder, which includes:

a first subassembly, which includes:

an elongated housing having a bore formed therethrough and having a tapered end to seat with portions of the extruder through which the strand material is to be strung-up, the housing having the other end stepped with portions of the bore opening thereto being rounded, the housing having a slot out longitudinally thereof communicating with the bore and sufficient to permit passage of the strand material therethrough;

a handle having a bifurcated portion with a bore formed through the bifurcated portion for receiving the elongated housing; and means for urging together the bifurcated portion of the handle to further secure the housing therewithin; and a second subassembly adapted to be mounted rotatably within the first subassembly, which includes:

a tubular member having a slot formed longitudinally thereof and sufficient to permit passage of the strand material therethrough; and a knob attached to the tubular member and having an opening formed therethrough, further the knob being stepped at one end thereof adjacent the housing and adapted to mate with the stepped end of the housing;

the centerline of the opening being aligned with the centerline of the housing when the tubular member is inserted into the housing;

the rounded entrance portions of the bore through the housing facilitating the insertion angularly laterally of a leading end of the strand material into and through the slot in the tubular member;

the second subassembly being rotatable with respect to the first subassembly between one position in which the slots are aligned and another position in which the slots are misaligned;

the mating of the stepped end of the knob with the stepped end of the housing determining the other position and the abutting of the one end of the knob with the one end of the housing without mating of the stepped portions thereof determining the one position;

the withdrawal of the device from engagement with the extruder axially along the strand material and the aligning of the slots facilitating the movement of the device laterally of the strand material to cause the strand material to be passed through the aligned slots and the device to be spaced from the strand material prior to the operation of the extruder while the strand material is maintained strung-up through the extruder.

11. A device for threading strand material through an apparatus, the device being removable from the apparatus prior to the operation of the apparatus, which includes:

an elongated guide member having a longitudinally extending slot formed therein and having a cross-sectional area sufficient to receive the strand material;

a hollow open-ended housing adapted to receive the guide member with the outwardly facing surface of the guide member being in rotary sliding engagement with the inwardly facing surface of the housing and having a slot sufficient to permit a section of strand material to be passed therethrough formed longitudinally thereof and having one end adapted to be seated with portions of the walls of an entrance of an orifice of the apparatus to be threaded;

the guide member mounted in the housing capable of being rotated therein from a strand-disengagement position in which the slots are aligned to at least one strand-receiving strand-threading position in which the slots are misaligned to preclude moving of the device laterally and spaced from the portions of the strand material; and means connected to one end of the guide member and having an opening aligned with the slot in the guide member and communicating with an external surface thereof for turning the guide member relative to the housing between the strand-receiving strand-threading position to the strand-disengagement position;

the end of the guide member adjacent the one end of the housing being tapered to cooperate with the one end of the housing when the guide member is in the strand-threading position to form a configuration adapted to seat in engagement with the walls of the entrance to the extruder orifice and to align the slot of the guide member with the orifice of the apparatus to be threaded;

the centerline of the slot of the guide member in the strand-threading position being offset from the longitudinal centerline of the housing;

the alignment of the end of the housing of the device with the orifice facilitating the threading of successive sections of the strand material therethrough whereafter the device may be moved axially longitudinally of the strand material and the guide member turned rotatably with respect to the housing to align the longitudinal slots and the opening in the turning means and permit moving the device laterally of the path of travel of the strand material;

whereby the device may be removed from the apparatus and the strand material piror to the operation of the apparatus.

12. The device of claim 11, which also includes:

a supporting member having a bore formed therethrough and having a slot cut radially of the bore; and wherein the turning means includes a knob attached to one end of the guide member, the knob having a bore formed therethrough with the axis of the bore colinear with the axis of the bore of the guide member;

the knob having an opening formed radially therethrough aligned with and communicating the bore thereof with the external surface of the knob;

the opening formed radially through the knob being exposed when the slots of the guide member and housing are misaligned to permit a leading end of a section of the strand material to be inserted through the opening and into the aligned slot of the guide member;

the housing having a rounded entrance to the bore at the one end thereof to facilitate the insertion of the leading end of the strand material into the slot of the guide member;

the housing being mounted in the bore of the supporting member and extending longitudinally transversely of the supporting member;

the slot in the housing being aligned with the slot in the supporting member to permit the device to be moved laterally of the strand material subsequent to the string-up thereof.

13. A device for threading strand material through a core tube of an extruder, and capable of being disengaged from the extruder prior to the operation of the extruder, which includes:

a rod having a groove of a cross-sectional area adequate to receive a section of the strand material therein cut longitudinally thereof parallel to the axis of the rod and having one end tapered;

a knob having a cavity formed therein with the rod secured within the cavity with one end of the rod abutting the wall of the bottom of the cavity, the portion of the knob from which the rod extends being stepped with a generally semi-circular portion of the knob extending along the rod and in engagement therewith, the knob having a slot formed therethrough and aligned with the groove of the rod; and a housing having a passage formed therethrough for mounting the rod rotatably therewithin and having a slot sufficient to pass the strand material therethrough cut longitudinally radially thereof communicating the passage with the external surface of the housing;

the housing having one end thereof tapered and the other end stepped to mate with the stepped end of the knob with one longitudinal segment of the housing as defined as that portion of the housing on one side of a plane through the slot extending beyond that longitudinal segment on the other side of the plane;

a handle having a bore cut centrally therethrough for receiving the housing and having a slot communicating with the bore and the slot of the housing;

means for securing the housing within the bore of the handle;

the turning of the knob and the rod to engage the end face of the semi-circular portion of the knob with the end face of the one extending longitudinal segment of the housing in one rotational orientation defining at least one position in which the groove of the rod is aligned with the slot of the housing;

the turning of the knob until the semi-circular portion is aligned with the other longitudinal segment of the housing defining another position wherein the groove and the slot are misaligned;

the stepped portions being mated by aligning the semi-circular portion of the knob with the other longitudinal segment of the housing and then causing relative longitudinal movement therebetween to move the knob toward the housing;

the mating of the stepped portions of the knob and the housing locking the rod against rotary movement;

the turning of the rod to the other position to misalign the groove of the rod with the slot of the housing causing the tapered end of the rod to cooperate with the tapered end of the housing to form a device having a tapered end which seats with the walls of the core tube and to align the groove with the opening through the core tube;

the misalignment of the groove in the rod with the slot in the housing covering the groove and facilitating the insertion of the leading end of a section of the strand material into the slot of the knob and then into the covered groove;

the assembly of the rod with the housing with the groove of the rod and the slot of the housing misaligned facilitating the movement of the device and the section of the strand material therein without relative movement therebetween into mating engagement with the core tube to permit threading of the strand material through the extruder and the withdrawal of the device out of engagement with the extruder and rearwardly along the strand material subsequent to the threading while the strand material is maintained threaded through the extruder;

the causing of relative longitudinal movement between the rod and the housing spacing the knob from the housing and subsequent relative rotary movement causing the end face of the depending semi-circular portion of the knob to engage the end face of the extending longitudinal segment of the housing and cause the slot to be aligned with the groove;

the alignment of the slot of the housing with the groove permitting the device subsequent to withdrawal of the device from engagement with the extruder to be moved laterally of the strand material prior to operation of the extruder.

14. The device of claim 13, wherein the knob and at least a portion of the handle are made from a heat resistant material adequate to remain at a relatively cool temperature while the rod and housing are in engagement with the extruder.

15. The device of claim 13, wherein the intersection of the edges of the end faces of the stepped portion of the housing and the inwardly facing surface thereof are rounded, the rounded opening oriented toward the knob facilitating the insertion of a leading end of the strand material into and through the slot of the rod when the rod is in the other position.

16. The device of claim 13, wherein the cross-sectional area of the groove in the rod is slightly greater than the cross-sectional area of the strand material to be threaded therethrough.

17. The device of claim 13, wherein the cross-sectional area of the groove in the rod is slightly greater than the cross-sectional area of the largest gauge strand material expected to be threaded through the extruder.

18. The device of claim 13, wherein the taper formed about the solid portion at one end of the rod is such that when the rod and the housing are in the locked position, the tapered end of the housing and the tapered end of the rod cooperate to form a frustum of a generally right circular cone having parallel bases, one base thereof being through an end of the housing, the right circular cone being formed to mate with the walls of the extruder opening and such that the centerline of the groove in the locked position is the centerline of the cone generated, the centerline of the groove in the locked position being offset from the centerline of the housing.

19. The device of claim 13, wherein the slot in the knob is cut transversely at an angle other than ninety degrees to the semi-circular portion of the knob.

20. A device for threading a strand material through an extruder, which includes:

a first subassembly, which includes:

an elongated tubular housing having a slot cut longitudinally radially thereof;

the slot being of such width to permit the passage of strand material therethrough;

a handle having a bore formed therethrough anehaving a slot communicating with the bore;

the housing being received in the bore of the handle with the slot of the handle aligned with the slot in the housing; and means for securing the housing within the bore;

one end of the housing being stepped such that a depending portion of the housing has a generally semi-circular cross-sectional shape;

the entrance to the chamber within the housing at the stepped end of the housing being rounded;

the other end of the housing being a truncated cone with the plane of cut-off being oblique to the axis of the housing and with the slot intersecting the plane of cut-off at a point spaced from the farthest extending end of the truncated cone of the housing; and a second subassembly adapted to be mated with the first subassembly, which includes:

a rod having a groove formed longitudinally thereof;

the rod capable of being inserted into the housing and mounted rotatably therein;

the groove being of such width to permit receipt of a section of the strand material therein;

portions of one end of the rod other than that through which the groove is formed being tapered; and a knob having a cavity formed therein and into which the other end of the rod is inserted;

means for securing the rod within the cavity to prevent unintended relative longitudinal and rotational movement between the rod and the knob;

the centerline of the cavity being aligned with the centerline of the housing;

the knob having a slot cut therethrough and communicating the cavity with the external surface of the knob;

the knob being stepped at the end thereof from which the rod extends, such that the depending portion of the knob is generally of a semi-circular cross-sectional shape;

the second subassembly being rotatable with respect to the first subassembly between one position in which the housing slot and the rod groove are aligned and at least one other position in which the slot and the groove are misaligned;

the alignment of the depending portion of the knob with the instep of the housing determining at least one of the other positions, the misalignment thereof conditioning the device for determining the one position;

the causing of relative movement longitudinally of the rod and housing when the depending portion of the knob is aligned with the instep of the housing to mate the stepped portions being effective to lock the subassemblies in the at least one other position to facilitate the insertion of a leading portion of the strand material into the slot of the knob and then into the groove in the rod;

the causing of the relative longitudinal movement to mate the stepped portions causing the one end of the rod to be moved into the opening of the housing chamber to the plane of cut-off of the truncated cone at the one end of the housing to cooperate with the one end of the housing to form a cone having one base through the farthest extending end of the housing being normal to the housing axis, the other base being oblique thereto, with the shortest element of the cone being the side of a right circular cone formed by portions of the housing and the portion of the rod protruding through the plane of cut-off and adapted to mate with the walls of the extruder opening such that the groove of the rod which is displaced rotationally from the housing slot is aligned with the extruder opening; and the withdrawal of the device from engagement with the extruder axially along the strand material subsequent to the threading of sections of the strand material through the extruder and the aligning of the housing slot and the rod groove facilitating the movement of the device laterally of the strand material to cause the strand material to be passed through the aligned slots of the housing, handle and knob and the device to be spaced from the strand material prior to the operation of the extruder.

21. A hand tool for threading strand material through an extruder, which comprises:

a longitudinally-slotted open-ended guide member, a slot thereof being capable of receiving a section of the strand material therein;

means disposed about the guide member for covering and uncovering the slot in the guide member;

means for moving the covering means and the guide member relative to each other to cover and uncover the slot in the guide member; and means for supporting the guide member, the disposing means and the moving means to permit them to be placed adjacent the extruder and the strand threaded therethrough and to then permit them to be moved along the strand material and the slot uncovered to remove the hand tool from the strand material.

22. A hand tool for threading strand material through an extruder, which comprises:

a first elongated open-ended hollow member having a slot cut longitudinally therein of sufficient size to receive a section of the strand material therein;

a second elongated open-ended hollow member having a slot cut longitudinally therein, with the second member adapted to receive the first member therein such that the members may be moved relative to each other;

means for moving the members relative to each other to align and misalign the two longitudinal slots; and supporting means for the two members and the moving means to permit the hand tool to be placed adjacent the extruder with the two slots misaligned and the strand threaded therethrough and to then permit the hand tool to be moved out of proximity of the extruder and along the strand material whereafter the slots are aligned to permit removal of the hand tool from the strand material.

* * * * *